(12) United States Patent  
Kumar et al.

(10) Patent No.: US 10,814,856 B2  
(45) Date of Patent: Oct. 27, 2020

(54) SYSTEM AND METHOD FOR DETERMINING EFFECTIVENESS OF A FRICTION MODIFIER ALONG A ROUTE SEGMENT

(71) Applicant: General Electric Company, Schenectady, NY (US)

(72) Inventors: Ajith Kuttannair Kumar, Erie, PA (US); Joseph Forrest Noffsinger, Lee's Summit, MO (US)

(73) Assignee: GE GLOBAL SOURCING LLC, Norwalk, CT (US)

( * ) Notice: Subject to any disclaimer, the term of this patent is extended or adjusted under 35 U.S.C. 154(b) by 140 days.

(21) Appl. No.: 15/671,100

(22) Filed: Aug. 7, 2017

(65) Prior Publication Data

US 2017/0334418 A1    Nov. 23, 2017

Related U.S. Application Data

(63) Continuation-in-part of application No. 13/973,016, filed on Aug. 22, 2013, now abandoned.

(Continued)

(51) Int. Cl.
*B61C 15/14*    (2006.01)
*B61K 9/08*    (2006.01)
(Continued)

(52) U.S. Cl.
CPC ............ *B60T 17/228* (2013.01); *B60T 8/172* (2013.01); *B60T 8/1763* (2013.01); (Continued)

(58) Field of Classification Search
CPC ............ B61C 15/14; B61K 9/08; B60T 8/171; B60T 8/172; B60T 8/1705
See application file for complete search history.

(56) References Cited

U.S. PATENT DOCUMENTS

2004/0060375 A1    4/2004    Kumar  
2005/0065701 A1    3/2005    Kumar  
(Continued)

FOREIGN PATENT DOCUMENTS

WO    0017625 A1    3/2000

OTHER PUBLICATIONS

English version of technical report for corresponding Brazilian Application No. BR102014014174-0 issued in the official Gazette # 2564 of Feb. 27, 2020.

*Primary Examiner* — Imran K Mustafa  
(74) *Attorney, Agent, or Firm* — The Small Patent Law Group LLC; Philip S. Hof

(57) ABSTRACT

A method includes obtaining creep measurements and tractive/braking measurements from at least one vehicle system at different locations along a route segment while the at least one vehicle system moves through the route segment. The method also includes calculating tribology characteristics of the route segment at the different locations. The tribology characteristics are based on the creep measurements and the tractive/braking measurements from the at least one vehicle system. The tribology characteristics are indicative of a friction coefficient of the route segment at the different locations. The method also includes determining an effectiveness of a friction modifier applied to the route segment based on the tribology characteristics.

21 Claims, 5 Drawing Sheets

Related U.S. Application Data

(60) Provisional application No. 61/834,395, filed on Jun. 12, 2013.

(51) Int. Cl.

| | | |
|---|---|---|
| *B60T 8/172* | (2006.01) | |
| *B60T 17/22* | (2006.01) | |
| *B60T 13/66* | (2006.01) | |
| *B60T 8/1763* | (2006.01) | |
| *B61C 15/08* | (2006.01) | |

(52) U.S. Cl.
CPC ............ *B60T 13/665* (2013.01); *B61C 15/08* (2013.01); *B61C 15/14* (2013.01); *B61K 9/08* (2013.01); *B60T 2210/12* (2013.01); *Y02T 30/10* (2013.01)

(56) References Cited

U.S. PATENT DOCUMENTS

| | | | |
|---|---|---|---|
| 2006/0282199 A1* | 12/2006 | Daum | B60L 15/36 |
| | | | 701/19 |
| 2007/0001629 A1 | 1/2007 | McGarry | |
| 2007/0219682 A1* | 9/2007 | Kumar | B61L 3/006 |
| | | | 701/19 |
| 2014/0142791 A1* | 5/2014 | Boehni | F16N 29/00 |
| | | | 701/19 |

* cited by examiner

SYSTEM AND METHOD FOR DETERMINING EFFECTIVENESS OF A FRICTION MODIFIER ALONG A ROUTE SEGMENT

CROSS-REFERENCE TO RELATED APPLICATIONS

This application is a continuation-in-part of U.S. application Ser. No. 13/973,016 filed 22 Aug. 2013, which claims the benefit of U.S. Provisional Patent Application No. 61/834,395, filed on 12 Jun. 2013, which is incorporated herein by reference in its entirety.

BACKGROUND

Embodiments of the subject matter described herein relate to systems and methods of determining a condition of a route that is traversed by a vehicle system.

The ability of a vehicle system to provide tractive efforts for propelling the vehicle system along a route is dependent upon the friction between a propulsion-generating component (e.g., wheel) and a surface of the route. Monitoring and controlling this friction may lead to the reduction in operating costs. For example, routes for rail vehicle systems (e.g., locomotives, tram lines, monorails, subways, mining equipment, and the like) typically include tracks (e.g., rails) that are traversed by the vehicle systems. In many cases, the forces applied by such rail vehicle systems provide a significant amount of stress and wear on the rails of the tracks and certain components of the rail vehicle systems. Railroad owners often monitor rail conditions to ensure that the locomotives can operate efficiently. For instance, it is often desirable that the coefficients of friction (COFs) (or other friction metrics) of the rails are within a designated range to (a) reduce wearing of the rails and wearing of the wheels of the locomotives and/or (b) to obtain a desired adhesion between the rails and the wheels. To this end, railroads may apply a lubricant to the rails to reduce the COF. Reducing the COF may not only reduce the wear on rails and wheels, but may also lead to fuel savings. In other cases, railroads may desire a greater adhesion and, thus, apply a substance that increases the adhesion between the wheels and rails.

To monitor the COF or other friction metric, railroads may test a number of points along the rails with a tribometer. For example, once a month (or other frequency) a railroad may take a series of measurements along a segment of the track, such as a curve of the track. The segment of the track may extend for a substantial distance, such as a half mile or mile. The measurements are often taken manually in which an inspector walks along the track with the tribometer riding the rail.

This conventional measurement process, however, can be cumbersome and can take a substantial amount of time. On some occasions, the process can even disrupt rail traffic. Furthermore, railroads are often responsible for overseeing thousands of miles of tracks and may have hundreds of route segments that are frequently tested. Hundreds of instruments may be necessary to sufficiently monitor these route segments. Such instruments may, at times, become faulty or have an undetected measurement bias that leads to incorrect data. Accordingly, the costs of monitoring the rails can be large and difficult to manage.

BRIEF DESCRIPTION

In an embodiment, a method includes obtaining creep measurements and tractive/braking measurements from at least one vehicle system at different locations along a route segment while the at least one vehicle system moves through the route segment. The method also includes calculating tribology characteristics of the route segment at the different locations. The tribology characteristics are based on the creep measurements and the tractive/braking measurements from the at least one vehicle system. The tribology characteristics are indicative of a friction coefficient of the route segment at the different locations. The method also includes determining an effectiveness of a friction modifier applied to the route segment based on the tribology characteristics.

In another embodiment, a system (e.g., monitoring system) is provided that includes a receiver configured to receive creep measurements and tractive/braking measurements from at least one vehicle system at different locations along a route segment while the at least one vehicle system moves through the route segment. The system also includes a calculation module configured to calculate tribology characteristics of the route segment at the different locations. The tribology characteristics are based on the creep measurements and the tractive/braking measurements from the at least one vehicle system. The tribology characteristics are indicative of a friction coefficient of the route segment at the different locations. The system also includes an analysis module configured to determine an effectiveness of a friction modifier applied to the route segment based on the tribology characteristics at the different locations.

In another aspect, a system (e.g., control system of a vehicle system) is provided that includes a vehicle-control module configured to control tractive and braking operations of a vehicle system. The system also includes a measurement module configured to obtain creep measurements and tractive/braking measurements of the vehicle system at different locations along a route segment while the vehicle system moves through the route segment. The system also includes a transmitter configured to communicate the creep measurements and the tractive/braking measurements from the vehicle system. The vehicle-control module is configured to increase the tractive effort of a first wheelset by a designated amount and decrease the tractive effort of a second wheelset by the designated amount thereby maintaining a total tractive effort of the vehicle system. The measurement module is configured to obtain the creep measurements and the tractive/braking measurements when the first and second wheelsets operate at increased and decreased tractive efforts, respectively.

DETAILED DESCRIPTION

Figure 1:
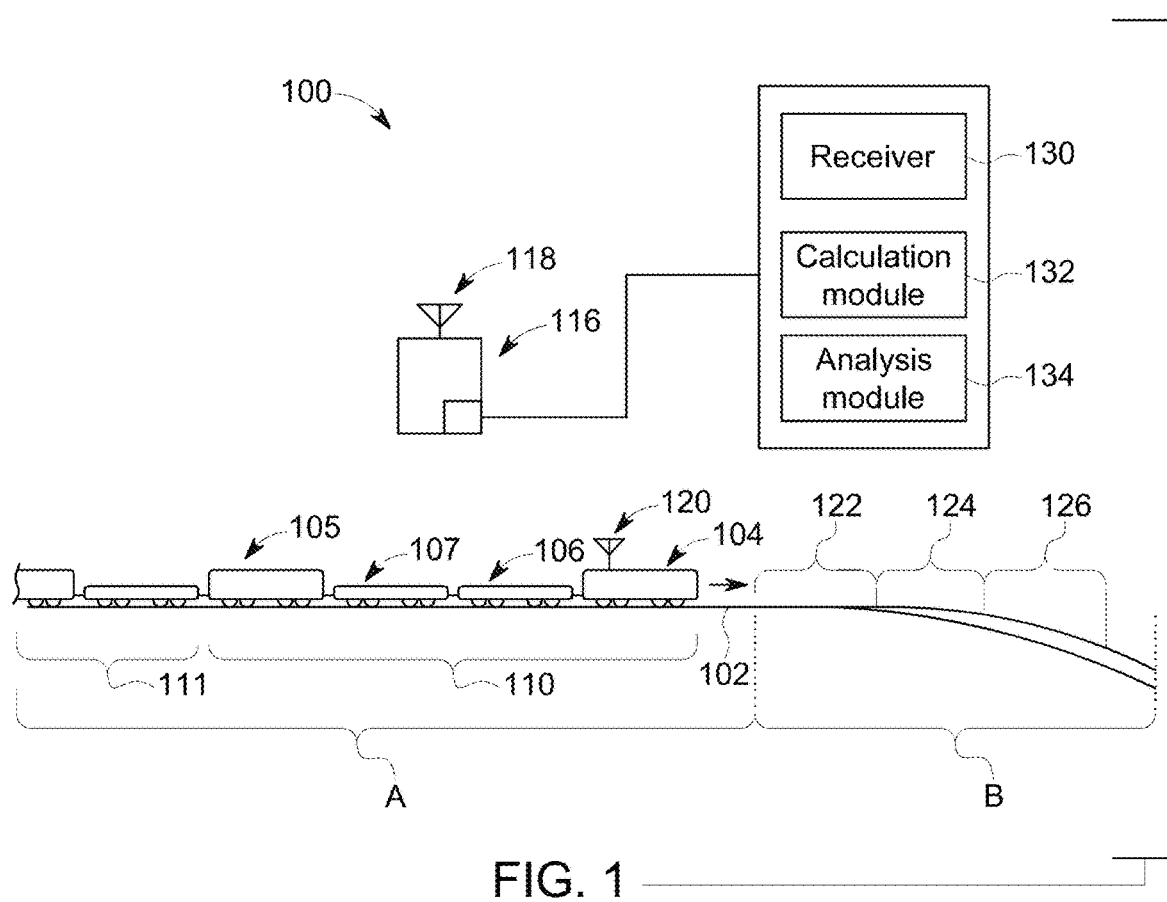
FIG. 1 is a schematic diagram of an embodiment of a vehicle system traversing a track.

Embodiments of the inventive subject matter described herein include methods and systems for monitoring one or more tribology characteristics of a route that is traversed by a vehicle system. Tribology is a branch of engineering that relates to the friction, wear, and/or lubrication between surfaces, such as the two surfaces that define the wheel-rail interface. Tribology may be used to describe an effectiveness of a friction modifier that has been applied to the route. For example, after a friction modifier has been applied to a region-of-interest of a route, vehicle systems traversing the route spread the friction modifier along surfaces of the route. It may be desirable to know (a) whether the friction modifier has spread beyond the region-of-interest and/or (b) whether the friction modifier remaining within the region-of-interest is sufficient to achieve the target effect. As such, embodiments may obtain and/or analyze tribology data to determine the effectiveness of the friction modifier along the designated segment of the route. In one specific example, embodiments may obtain and/or analyze tribology data to determine the effectiveness of a friction modifier along a designated segment of a track that is traveled along by rail vehicle systems (e.g., locomotives). Tribology data provides information regarding friction along the route. The tribology data may include, for example, coefficients of friction COFs (or friction coefficients), adhesion coefficients, or other friction metrics at different locations along the route.

A vehicle system includes at least one propulsion-generating vehicle that generates vehicle tractive efforts (TEs) for propelling the vehicle system. The propulsion-generating vehicle may also generate vehicle braking efforts (BEs) for slowing or stopping the vehicle system. A vehicle system may include multiple propulsion-generating vehicles. In such instances, the multiple propulsion-generating vehicles may be arranged to form a single vehicle consist or a plurality of vehicle consists. In some embodiments, the propulsion-generating vehicles of a single vehicle consist are configured to communicate with each other to coordinate vehicle TEs and/or vehicle BEs. Vehicle systems may also include multiple vehicle consists. In some cases, the vehicle consists may communicate with one another.

While the description herein refers to rail vehicles, locomotives, tracks, and the like, not all embodiments are so limited. The inventive subject matter described herein may be used in connection with one or more other vehicles and routes, such as automobiles traveling along roads. Accordingly, in some instances, the terms rail vehicle and track (or rails) may be substituted with more general terms of vehicle and route.

As used herein, a "vehicle TE" refers to the tractive effort provided by a single propulsion-generating vehicle (e.g., locomotive). An "axle TE" refers to the tractive effort provided by a single wheelset or axle of a propulsion-generating vehicle. In some cases, a propulsion-generating vehicle may have individually controllable wheelsets. For example, the traction motors on a single locomotive may be selectively controlled such that it is possible to provide different tractive and/or braking efforts among the wheelsets of the locomotive. A first wheelset may provide 30 klbs (about 13,600 kg) of TE and a second wheelset may provide 10 klbs of TE (about 4,500 kg). Thus, the axle TEs of the first and second wheelsets are 30 klbs (about 13,600 kg) and 10 klbs (about 4,500 kg), respectively. A "system TE" refers to the total tractive effort provided by a vehicle system, which may include plural propulsion-generating vehicles or only one propulsion-generating vehicle. Thus, for cases in which the vehicle system has only a single propulsion-generating vehicle, the system TE is equal to a vehicle TE.

A route segment is a portion of the route that includes a region-of-interest and, optionally, one or more baseline portions extending from the region-of-interest. The route segment may be referred to as a "track segment" for embodiments that include rail vehicle systems (e.g., locomotives). The region-of-interest may have had a friction modifier directly applied to the rails within the region-of-interest. As such, the region-of-interest may also be referred to as a surface-modified portion of the route. Non-limiting examples of regions-of-interest include curves, heavily trafficked segments, or segments that have been affected by environmental conditions (e.g., snowfall, leaves, mud, and the like). In some cases, it may be suspected that the friction modifier has spread beyond the region-of-interest and into the baseline portion(s).

The region-of-interest may be the entire route segment or only a portion of the route segment. A precise length or dimension of the route segment may be determined before analyzing the tribology data or only after analyzing the tribology data. For example, although it may be known before analysis that the friction modifier was directly applied between mile post 214 and mile post 215, it may not be known an extent of spreading beyond the mile post 214 and beyond the mile post 215. Accordingly, only after analyzing the data may it be determined that the route segment extends between, for example, the mile post 213 and the mile post 216.

Embodiments described herein may obtain creep measurements and tractive/braking measurements as a vehicle system is traveling along a route segment. A creep measurement may be based on an amount of slippage of one or more wheels during operation of the vehicle system. Maximum tractive or braking effort may be obtained if each wheel of the propulsion-generating vehicle is rotating at such an angular velocity that its actual peripheral speed is slightly higher (for traction) or slightly lower (for braking) than the true vehicle speed, which may be referred to as the "ground speed" or "track speed" of the propulsion-generating vehicle. The difference between wheel speed and track speed may be referred to as "slip speed." There is a relatively low limit value of slip speed at which a peak tractive effort or braking effort is realized. This value, which may be referred to as a "maximum creep speed" or "optimum creep," is a variable that depends on track speed and rail conditions. Provided that the maximum creep speed is not exceeded, slip speed is normal and the propulsion-generating vehicle will operate in a stable microslip or creep mode. If wheel-to-rail adhesion is reduced or lost, however, some or all of the wheels may slip excessively. In other words, wheels may slip when the actual slip speed is greater than the maximum creep speed. This may cause a wheel slip condition. A wheel slip condition that occurs during a tractive operation may include one or more spinning wheels. A wheel slip condition that occurs during a braking operation may include one or more sliding or skidding wheels.

Creep measurements may also be referred to as or characterized as wheel slip, wheel creep, slip speed. In some embodiments, creep measurements can be expressed as a percentage of the current speed (e.g., ground speed, track speed) or a value above/below the current speed. In some embodiments, a creep measurement is obtained, at least in part, by calculating a difference between a ground speed (e.g., speed at which the propulsion-generating vehicle or the vehicle system is traveling) and a wheel speed (e.g., angular velocity of the wheel). Creep measurements may be acquired in other manners. For example, creep measurements may be detected by an abrupt change in the traction motor current or an abrupt change in the revolutions per minute (rpms) of the traction motor or axle. Another manner of detecting creep measurements may include using a rotary sensor on the traction motor or drive axle. Other manners of obtaining creep measurements may be used.

The creep measurement and the tractive/braking operation may be acquired at approximately the same time such that useful tribology data may be obtained regarding a designated portion or point along the track. For instance, the measurements may be acquired simultaneously, concurrently, or immediately after each other. In some embodiments, one creep measurement is correlated or associated with one tractive/braking measurement. In other embodiments, however, multiple creep measurements may be correlated or associated with one tractive/braking measurement or one creep measurement may be correlated or associated with multiple tractive/braking measurements. As an example, first, second, and third tractive measurements may be obtained at 30 meters, 60 meters, and 90 meters, respectively, but only one creep measurement may be obtained between 30 and 90 meters. In such instances, the single creep measurement may be paired with each of the first, second, and third tractive measurements when the tribology data is analyzed.

In some cases, an average of the multiple measurements (e.g., creep and/or tractive/braking) may be calculated and the averaged measurement may be communicated. In some cases, one or more measurements may be specific to an axle or wheelset while other measurements are associated with a propulsion-generating vehicle as a whole. For example, the creep measurement may be associated with a locomotive, but the tractive/braking measurement may be related to a specific wheelset of the locomotive or vice-versa. Creep and tractive/braking measurements that are associated with each other may also be associated with a specific region of the track. By way of example, a region along the track (e.g., 0.25 km to 0.28 km) may be associated with a calculated/detected creep measurement and associated with a calculated/detected TE measurement.

Tractive/braking measurements (which may also be referred to as "at least one of tractive and braking measurements") include measurements that are based on or indicative of tractive effort (or horsepower) and measurements that are based on or indicative of braking efforts. Tractive/braking measurements may be obtained by monitoring or detecting motor characteristics, such as motor current, motor RPMs, motor torque, and motor power. In some cases, tractive/braking measurements may be acquired by monitoring or detecting inter-vehicle forces (e.g., using a coupling hook between locomotive and load) or measuring a vehicle speed. TE may be characterized as an amount of force that the motive power must produce to move a train without slipping the wheels. TE may be detected by sensors and/or may be calculated by acquiring other measurements. TE may be calculated by multiplying an adhesion coefficient with an appropriate weight parameter (e.g., weight of the locomotive, weight per axle, and the like). More specifically, a maximum TE value may be directly proportional to weight and adhesion. TE may also be calculated by dividing horsepower by speed. Braking measurements may be acquired in a similar manner as acquiring TE measurements.

As described herein, embodiments may use the creep measurements and tractive/braking measurements to determine a tribology characteristic that is then used to determine an effectiveness of a friction modifier (e.g., lubrication, sand, or other substance, and air). The tribology characteristic may be an adhesion coefficient, a COF, or the like. A friction modifier may increase or decrease friction. For example, lubrication may reduce the COF or adhesion coefficient whereas sand may increase the COF. In some cases, the tribology characteristic may be calculated after attempting to remove at least some of the friction modifier by blowing with air or wiping with another surface.

In some embodiments, the measurements are acquired during normal operation of the vehicle system. For example, the measurements may be acquired without deviating from an operating plan or without deviating from inputs or instructions from an operator (e.g., engineer). An operating plan, which may also be referred to as a trip plan or mission plan, may include instructions for controlling the propulsion-generating vehicles to provide designated TEs and/or designated BEs for predetermined portions of a trip. The instructions may be expressed as a function of time and/or distance of a trip along a route. The vehicle system may be autonomously controlled according to the operating plan or the instructions of the operating plan may be presented to an operator of the vehicle system so that the operator can manually control the vehicle system according to the operating plan (also referred to as a "coaching mode"). The operating plans may be based on trip profiles, which may include, among other things, information about a geography of the route. The operating plans may also be based on operating information of the vehicle system, such as the size, weight, tractive effort, power output, weight distribution, and the like, of the vehicle system.

As used herein, a "vehicle system" may include a single propulsion-generating vehicle or multiple propulsion-generating vehicles. For those embodiments that include multiple propulsion-generating vehicles, the multiple propulsion-generating vehicles may be arranged into a single vehicle consist or a plurality of vehicle consists. As one specific example, a train may include first, second, and third locomotive consists, wherein each of the locomotive consists includes two locomotives.

At least one technical effect of embodiments described herein may include a more efficient use of a friction modifier. For example, embodiments may identify different locations and/or different amounts of the friction modifier to apply to the rails. Another technical effect may include a more efficient use of vehicle systems. With more tribology data and with tribology data that is more current than data obtained through conventional methods, the vehicle systems may be operated in a more efficient manner.

FIG. 1 is a schematic diagram of a vehicle system 100 formed in accordance with an embodiment. In the illustrated embodiment, the vehicle system 100 is a rail vehicle system. As shown, the vehicle system 100 is traveling along a portion of a route or track 102. While only one vehicle system 100 is shown in FIG. 1, it is understood that several vehicle systems may traverse the track 102. The vehicle system 100 includes a plurality of discrete vehicles. As used herein, "discrete" vehicles are separate and distinct vehicles that are capable of being removably coupled to and part of a larger vehicle system. The vehicle system 100 may be a rail vehicle system that includes at least one propulsion-generating vehicle (e.g., locomotive) and, optionally, at least one non-powered vehicle (e.g., rail car or passenger car) that are linked to one another.

In the illustrated embodiment, the vehicle system 100 includes propulsion-generating vehicles 104 and 105 and non-powered vehicles 106 and 107 that are mechanically linked to one another and are configured to travel as a group along the track 102. The terms "powered" or "propulsion-generating" refer to the capability of a vehicle to propel itself and not whether the vehicle receives or generates energy for one or more other purposes. For example, the non-powered vehicles 106, 107 may receive electric current to power one or more loads disposed onboard the non-powered vehicles 106, 107 (e.g., air conditioning, lighting, etc.).

In FIG. 1, the propulsion-generating vehicle 104 may be considered a principal or lead vehicle of a vehicle consist 110, and the propulsion-generating vehicle 105 may be considered a remote vehicle of the vehicle consist 110. A propulsion-generating vehicle that controls one or more other propulsion-generating vehicles may be referred to as "principal" or "lead" propulsion-generating vehicle, and propulsion-generating vehicles that are controlled by another propulsion-generating vehicle may be referred to as "remote" propulsion-generating vehicles. The plurality of propulsion-generating vehicles 104, 105 in the single vehicle consist 110 are configured to operate as a single moving apparatus. For example, the multiple propulsion-generating vehicles 104, 105 may coordinate TEs and/or BEs to propel the vehicle system 100 along the track 102. The propulsion-generating vehicles 104, 105 may also coordinate the acquisition of creep and/or tractive/braking measurements as described herein.

A vehicle system may be or include a single vehicle consist or include a plurality of vehicle consists that are directly or indirectly coupled to another. For example, the vehicle system 100 includes a second vehicle consist 111 that is coupled to the vehicle consist 110. When a vehicle system includes multiple vehicle consists, the vehicle consists may be referred to as sub-consists. If the vehicle system includes multiple vehicle consists, the vehicle consists may be configured to operate as a single moving apparatus. For example, the multiple vehicle sub-consists may be controlled by a master computing system that coordinates tractive and/or braking efforts among the sub-consists to control operation of the vehicle system as a whole. The master control system may also include instructions for acquiring creep and/or tractive/braking measurements as described herein.

In some embodiments, the vehicle system 100 has a distributed power system or is capable of operating in different modes. In a distributed power system, different propulsion-generating vehicles (or different vehicle consists) are capable of being controlled by a common control system, which may be on a principal vehicle. For example, a single vehicle system may include first and second propulsion-generating vehicles. A common control system for the vehicle system may instruct the first and second propulsion-generating vehicles in a manner that coordinates TEs and/or BEs of the vehicle system. More specifically, the common control system may communicate signals to the first and second propulsion-generating vehicles that include operating instructions. The common control system, however, may communicate different instructions to each of the propulsion-generating vehicles. For example, the first propulsion-generating vehicle may be instructed to operate at a high notch (or throttle) setting. At the same time, the second propulsion-generating vehicle may be instructed to operate at a lower notch setting or to apply brakes to the propulsion-generating vehicle. The common control system may be part of a single vehicle, may be distributed among the vehicles, or may be a remote system that controls the vehicle system wirelessly.

Likewise, a common control system may instruct multiple vehicle consists. As one specific example, a vehicle system may include a leading vehicle consist and a trailing vehicle consist. As this vehicle system is traversing a mountain, the leading vehicle consist may crest the mountain top and travel on the downward slope of the mountain. At this time, the common control system may instruct the leading vehicle consist to cease tractive efforts and commence braking. The trailing vehicle consist, however, may not have passed the mountaintop and may still be climbing the mountain. If so, the common control system may instruct the trailing vehicle consist to maintain tractive efforts. By operating the leading and trailing vehicle consists in a different manner, tensile forces at the mechanical couplers that connect adjacent vehicles may be reduced. Accordingly, different propulsion-generating vehicles or different vehicle consists of a single vehicle system may operate asynchronously or independent from each other. This may also be referred to as operating according to an asynchronous mode, independent mode, or decoupled mode.

It is noted that the embodiment of FIG. 1 is provided for illustrative purposes only, and other arrangements, orientations, and/or numbers of propulsion-generating vehicles and/or non-powered vehicles may be used in other embodiments. In some embodiments, the propulsion-generating vehicle 104 may control the operations of other propulsion-generating vehicles, such as the propulsion-generating vehicle 105. In other embodiments, a propulsion-generating vehicle other than the propulsion-generating vehicle 104 may act to control the operations of one or more other propulsion-generating vehicles. For example, the propulsion-generating vehicle 105 may control operations of the propulsion-generating vehicle 104. In some cases, the principal vehicle that controls the vehicle system 100 is the leading vehicle (e.g., first vehicle) that controls operation of other vehicles. In other cases, the principal vehicle may follow or trail other propulsion-generating vehicles while traveling.

FIG. 1 also shows two route segments A and B along the track 102. As shown, the vehicle system 100 is traveling along the route segment A in a left-to-right direction along the page. Each of the route segments A and B may have a different track condition. The track condition may be, at least in part, based on the friction between a surface of the track and a surface of the vehicle system that directly engages the surface of the track, such as the surface of a wheel. The track condition may also be based on a contour (e.g., grade or curvature) of the track. With respect to FIG. 1, the route segment A represents a portion of the track 102 that has a substantially straight and even route contour.

Route segment B illustrates a route segment that includes a region-of-interest 124 (e.g., within which may be a designated location of interest, such as a location designated in a trip plan or operation plan, and/or a fixed location of a stationary wayside lubricator or other stationary wayside friction modification device), which is a curve in FIG. 1. In other embodiments, the region-of-interest may include other track contours and/or tracks with various types of rail conditions. In particular embodiments, the region-of-interest is a portion of a track that has had a friction modifier applied to the rails. The friction modifier may be applied to effectively increase or decrease the COF or adhesion coefficient. Lubricants may be used to decrease the COR or adhesion coefficient. Non-limiting examples of friction modifiers that may be used to increase the COR or adhesion coefficient include sand (e.g., sandite), composition sticks (e.g., Kelsan HPF sticks), suspensions of colloidal silica particles, ethyl caprylate, tertiary butylamine solution, sodium metasilicate, or a mixture of any of the above.

As described herein, entities may desire to know whether the friction modifier is effective within the localized region in which it was applied and whether the friction modifier has undesirably spread into other portions of the route segment.

Accordingly, embodiments described herein may acquire a number of measurements to analyze the effectiveness of the friction modifier. The measurements may be creep measurements, tractive/braking measurements, and other measurements that facilitate the analysis. In addition to the region-of-interest 124, measurements may also be acquired within baseline portions 122 and 126 of the route 102, e.g., a designated leading border location 122 and a designated trailing border location 126. ("Border" refers to a location bordering adjacent to a region-of-interest, within a distance such that tribology measurements made at or within the border regions/locations are relevant to the region-of-interest, such as due to the possibility of lubricant spreading away from a designated or planned application area with the region-of-interest, e.g., by a curve, to the border regions where lubricant or other friction modifier application is not intended.) Due to the travel direction of the vehicle system 100, the baseline portion 122 (e.g., leading border location) is the leading baseline portion and the baseline portion 126 (e.g., trailing border location) is the trailing baseline portion. In the illustrated embodiment, each of the baseline portions 122 and 126 are substantially straight relative to the region-of-interest 124. In other embodiments, however, the baseline portions 122, 126 and the region-of-interest 124 may have various contours relative to each other. In some embodiments, the region-of-interest 124 is also substantially straight and even.

Fiction modifiers (e.g., lubricants) can be applied to the surface of a route (e.g., rail) using a friction modifier applicator. The friction modifier applicators can be stationary or nonstationary friction modifier applicators. There are several types of stationary friction modifier applicators, for example a wayside lubrication device or the like.

An exemplary wayside lubrication device is used on railways to lubricate segments of rail route which experience wear from train traversal, such as curves. Exemplary wayside devices are mounted on railways in a fixed position and apply a friction modifier, such as a lubricant, to the rail. Embodiments of wayside devices contain a sensor that detect the number of axles in the train and release lubricant. In an embodiment of the wayside device, lubricant is released directly on to the track through lubricant channels in the rail and the lubricant coats the wheel to decrease friction. One example of a wayside lubrication device is manufactured by Lincoln Industrial Corp., which is a division of Svenska Kullagerfabriken AB of Gothenburg, Sweden. See www.lincolnindustrial.com/products/automaticlubrication/railroadlubrication.aspx, which is incorporated by reference herein.

Friction modifier applicators may also be nonstationary, for example a truck applying sand or salt to a roadway.

The friction modifier will coat the wheels and/or the track or route to reduce friction or increase traction of the vehicle as it traverses the route.

Also shown in FIG. 1, the vehicle system 100 may communicate with an off-board system 116 (e.g., monitoring system) that can be disposed off-board (e.g., outside) of the vehicle system 100. For example, the system 116 may be disposed at a central dispatch office for a railroad company. The system 116 can generate and communicate various operating plans and/or communicate information regarding track conditions. The system 116 may also include one or more modules for receiving and analyzing the measurements acquired by the vehicle system 100. The system 116 can include a wireless antenna 118 (and associated transceiving equipment), such as a radio frequency (RF) or cellular antenna, that wirelessly transmits signals to the vehicle system 100. The vehicle system 100 may also include a wireless antenna 120 (and associated transceiving equipment).

Although the following is described with reference to an off-board monitoring system, it is understood that the system 116 and/or one or more of the modules 130, 132, 134 may be disposed onboard the vehicle system 100. In such embodiments, the vehicle system 100 may calculate tribology characteristics and determine an effectiveness of the friction modifier.

Returning to FIG. 1, the system 116 may include a receiver 130 that is configured to receive creep measurements and tractive/braking measurements from one or more vehicle systems that were obtained as the one or more vehicle systems moved through the route segment B. The creep measurements and the tractive/braking measurements that were acquired may be associated with different locations along the route segment B. The receiver 130 may include or be operably coupled to the wireless antenna 118. The receiver 130 may also include other electronic devices or components for receiving data. The receiver 130 may receive data wirelessly and/or through hard wires, such as telecommunication lines. The receiver 130 may be configured to process the signals that represent the creep measurements and the tractive/braking measurements in order to render the measurements more suitable for analysis.

The system 116 also includes a calculation module 132 that is configured to calculate tribology characteristics of the track 102. In particular, the calculation module 132 may calculate tribology characteristics of the route segment B at the different locations along the route segment B. The tribology characteristics may be based on the creep measurements and the tractive/braking measurements that were acquired from the one or more vehicle systems. A tribology characteristic that corresponds to a designated location along the track 102 may be based on or determined by the friction that exists between the surfaces of the wheel and the surfaces of the rails at the designated location. The tribology characteristics calculated herein may provide some information as to the amount of friction that exists between the surfaces.

The system 116 may also include an analysis module 134 that is configured to determine an effectiveness of the friction modifier applied to the route segment B. The effectiveness may be based on the calculated tribology characteristics at the different locations along the route segment B. The different locations may be a series of locations (e.g., successive locations). The effectiveness is based on the tribology characteristics (e.g., COFs, adhesion coefficients, or other friction metrics) of the route segment B that were calculated by the calculation module 132. In some embodiments, the analysis module 134 may compare the tribology characteristics at the different locations to expected tribology characteristics of the different locations. For example, a railroad may expect that the adhesion coefficients at different locations will not exceed certain values. Moreover, if the friction modifier was improperly applied, was spread by vehicle systems, was exposed to harsh environmental conditions, and the like, the adhesion coefficients may be affected.

Figure 5:
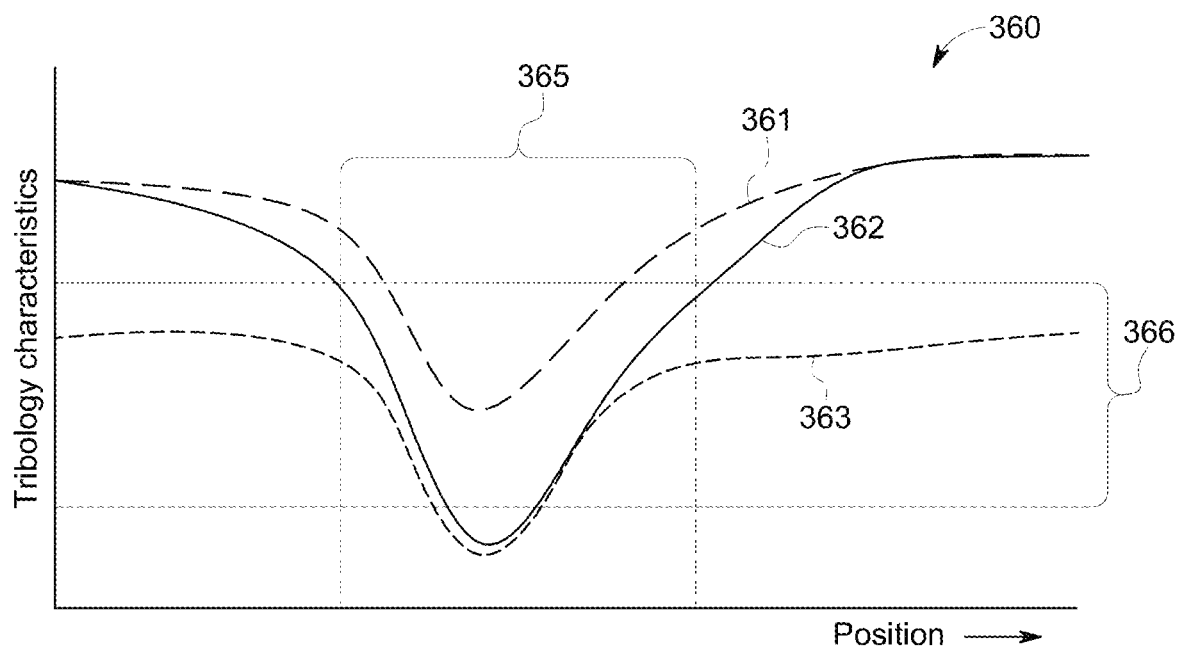
FIG. 5 illustrates a graph including representative curves that demonstrate a relationship between calculated tribology characteristics and locations within a route segment.

In some embodiments, the analysis module 134 may calculate a spread or distribution function of the friction modifier. The spread function may represent a relationship between track location and tribology characteristic value. For example, the tribology characteristic may be an adhesion coefficient value. One example of a range of adhesion coefficient values may be about 0.20 to about 0.60. FIG. 5 illustrates three different spread functions. From the spread function, one or more portions of the route segment that has an improper amount of friction modifier (e.g., too much or too little) can be identified. More specifically, the spread function may indicate one or more portions of the route segment that have an insufficient amount or an excessive amount of the friction modifier. In some embodiments, the analysis module 134 is configured to identify one or more regions of the route segment having an amount of the friction modifier that is below a first designated threshold (e.g., desired minimum or baseline amount of the friction modifier) and/or one or more regions above a second designated threshold (e.g., a desired maximum or limit amount of the friction modifier). In between the first and second designated thresholds may be a designated range for an amount of the friction modifier. The designated range may be configured (e.g., by a railroad) to (a) reduce wearing of the rails and wearing of the wheels of the locomotives and/or (b) to obtain a desired adhesion between the rails and the wheels.

In some embodiments, the analysis module 134 may use compensating data that relates to effectiveness of the friction modifier. More specifically, the values of the tribology characteristics may be determined or modified, in part, by various compensating factors. Compensating data may include, for example, a weight or load of the propulsion-generating vehicle or the vehicle system, speed of the vehicle system, environmental data (such as weather conditions, e.g., rain, snow, temperature), and/or external rail conditions, such as leaves or other debris on the route. Various formulas may be used by the calculation and analysis modules to determine the effectiveness of the friction modifier.

By way of one example, a number of vehicle systems may travel along a designated track segment in a single day. Over an extended period of time (e.g., days, weeks, months) weather conditions may change such that precipitation (e.g., ice, snow) develops on the surfaces of the track segment or debris (e.g., leaves, mud) is somehow provided on the surfaces of the track segments. For days with increased precipitation or increased debris, the tribology characteristics calculated by each of the vehicle systems that travel along the track segment may be less than the values of the tribology characteristics calculated by the vehicle systems that travel along the track segment when precipitation and debris are not present (e.g., warm days without rain or wind). Thus, when determining effectiveness of a friction modifier, embodiments may compensate or account for such changing weather conditions.

Figure 2:
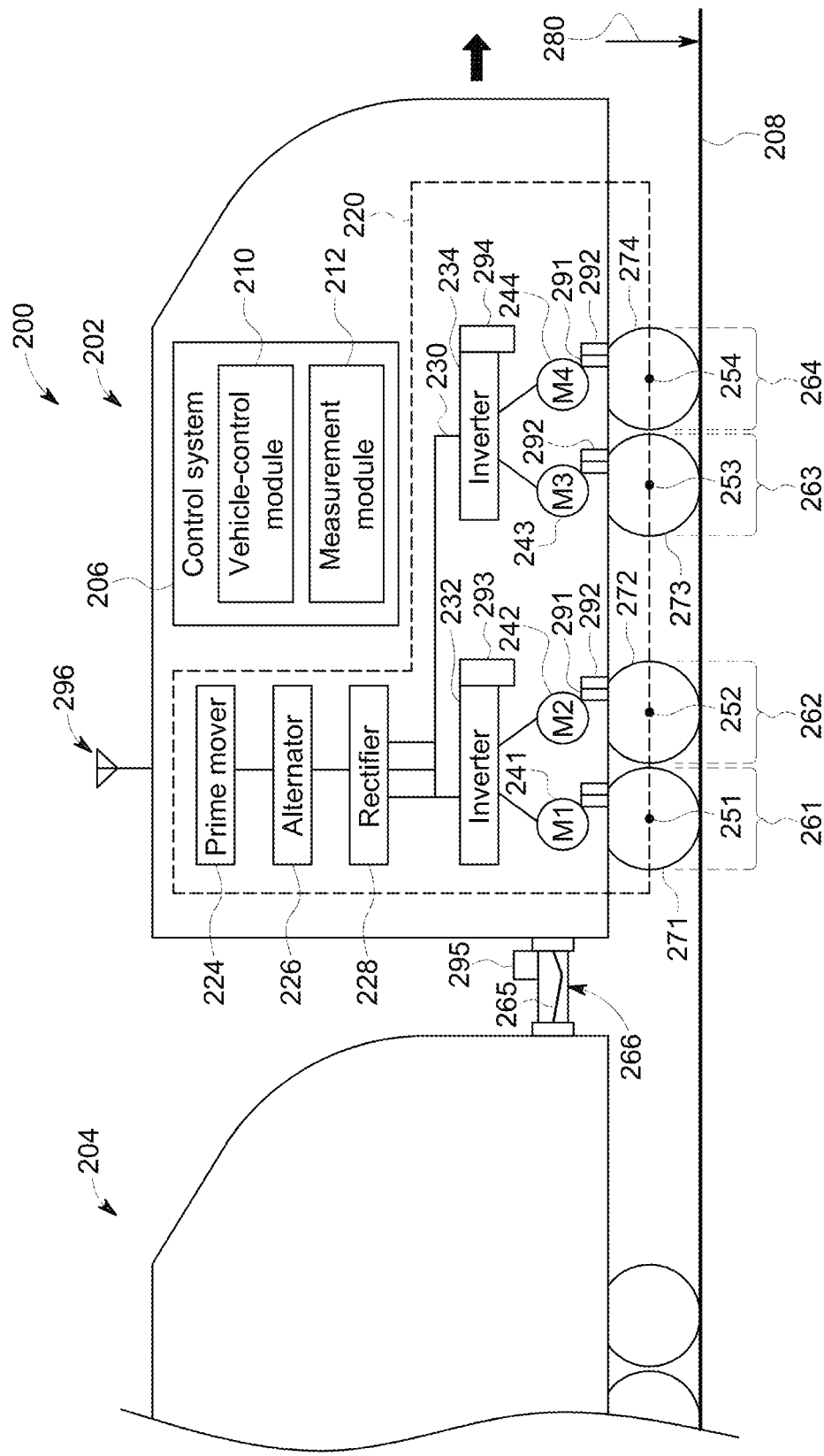
FIG. 2 is a schematic diagram of two propulsion-generating vehicles that are linked to each other in accordance with an embodiment.

FIG. 2 is a schematic diagram of a rail vehicle system 200 that includes a plurality of propulsion-generating vehicles 202, 204. The rail vehicle system 200 may be similar or identical to the vehicle system 100 (FIG. 1). The propulsion-generating vehicles 202, 204 may constitute or be part of a vehicle consist that may or may not be coupled with other vehicle consist(s) (not shown) in the rail vehicle system 200. In FIG. 2, the propulsion-generating vehicle 202 is a principal or lead propulsion-generating vehicle and the propulsion-generating vehicle 204 is a remote propulsion-generating vehicle that is controlled by the propulsion-generating vehicle 202. To this end, the propulsion-generating vehicle 202 includes a control system 206 that is configured to control operation of the propulsion-generating vehicle 202 and, optionally, propulsion-generating vehicle 204. In other embodiments, the propulsion-generating vehicle 204 may be the principal vehicle and may include a control system that is configured to control operation of the propulsion-generating vehicle 202. Alternatively, the control system 206 may be distributed between the propulsion-generating vehicles 202, 204. For embodiments that include multiple vehicle consists, the control system 206 may be configured to control operation of other vehicle consists.

The control system 206 may have a plurality of modules including a vehicle-control module 210 and a measurement module 212. The control system 206 and the modules 210 and 212 are configured to communicate signals to and receive signals from different components, assemblies, and sub-systems for controlling operation of the rail vehicle system 200. The control system 206 may be or include one or more controllers, processors, or other logic-based devices that perform operations based on one or more sets of instructions (e.g., software). In some cases, the different modules of the control system 206 are part of the same logic-based device or, alternatively, are distributed within multiple logic-based devices. The instructions on which the control system 206 operates may be stored on a tangible and non-transitory (e.g., not a transient signal) computer readable storage medium, such as a memory. The memory may include one or more computer hard drives, flash drives, RAM, ROM, EEPROM, and the like. Alternatively, one or more of the sets of instructions that direct operations of the control system 206 may be hard-wired into the logic of the control system 206, such as by being hard-wired logic formed in the hardware of the control system 206.

The vehicle-control and measurement modules 210, 212 are shown as being included in or as being part of a common structure of the control system 206. The modules 210, 212, however, are not required to be part of the same structure and may instead be separated from other portions of the control system 206 and/or each other. In some embodiments, one or more of the modules may be located off-board the propulsion-generating vehicle 202.

The vehicle-control module 210 is configured to control tractive and/or braking operations of the propulsion-generating vehicle 202. To this end, the vehicle-control module 210 is configured to communicate with a propulsion system 220 and a braking system (not shown). The vehicle-control module 210 may instruct (e.g., communicate signals to one or more components of the propulsion system 220) to increase or decrease power, tractive effort, etc. For example, the instructions may be in accordance with one or more operating plans that designate tractive operations (e.g., notch or throttle settings) and braking operations to be implemented by the rail vehicle system 200. The operating plan may include instructions for controlling tractive and/or braking efforts of a vehicle system for only a portion of the route or for the entire route. The instructions may be expressed as a function of time and/or distance of a trip along the track. In an embodiment, the vehicle-control module 210 may autonomously control operations of the propulsion-generating vehicle 202 according to the operating plan.

The propulsion system 220 can include a variable speed prime mover or engine 224 that is mechanically coupled to a rotor of a dynamo electric machine. In the illustrated embodiment, the dynamo electric machine is an alternator 226 and, in particular, a 3-phase alternating current (AC) synchronous alternator. The 3-phase voltages generated by the alternator 226 are supplied to input terminals of a power rectifier bridge 228. The rectifier bridge 228 may transform or modify the AC power from the alternator 226 into direct current (DC) power. The power rectifier bridge 228 has output terminals that supply the DC power to a DC link or bus 230. Although the propulsion system 220 is described as being an AC-type propulsion system that is powered by diesel, it is understood that embodiments set forth herein may also be implemented with DC-type propulsion systems and/or propulsion systems that are at least partially powered by electricity (e.g., batteries, catenary system, and the like).

As shown, the DC link 230 is electrically connected to inverters 232, 234. The inverters 232, 234 are configured to convert (e.g., invert) the DC power into AC power at a designated frequency for powering traction motors 241-244. The inverters 232, 234 may employ high power gate turn-off devices which switch in and out of conduction in response to gating signals from the control system 206 (or the vehicle-control module 210) so as to invert the DC voltage on the DC link 230 to a controlled frequency AC voltage.

Although not shown, the DC link 230 may also be electrically coupled to other components, such as a conditioning device and/or an auxiliary sub-system. The conditioning device may be configured to filter out unwanted frequencies and/or regulate the current of the DC link 230. The auxiliary sub-system may be operably coupled to one or more non-tractive components (e.g., compressors, fans or blowers, onboard air conditioners, radiators).

The motors 241, 242 are electrically connected to and powered by the inverter 232, and the motors 243, 244 are electrically connected to and powered by the inverter 234. The motors 241, 242 are electrically parallel to each other, and the motors 243, 244 are electrically parallel to each other. In some embodiments, the motors 241-244 are adjustable speed AC traction motors. Also shown, the motors 241-244 are operably coupled to axles 251-254, respectively, that are each coupled to wheels 271-274. The motors 241-244, the axles 251-254, and the wheels 271-274 may constitute respective axle wheelsets 261-264. For example, the motor 241, the axle 251, and a pair of wheels 271 may constitute the wheelset 261, which is configured to generate a TE for propelling the propulsion-generating vehicle 202 and, hence, the rail vehicle system 200. Each of the axle wheelsets 261-264 may be selectively controlled by the vehicle-control module 210 and the control system 206 to provide a designated TE (e.g., axle TE). More specifically, the axle wheelsets 261-264 of the propulsion-generating vehicle 202 may be selectively controlled to provide different axle TEs.

Although not shown, the propulsion-generating vehicle 204 may have a similar or identical propulsion system as the propulsion system 220. In some embodiments, the propulsion system of the propulsion-generating vehicle 204 (not shown) may be controlled by the control system 206. The propulsion-generating vehicles 202, 204 may be communicatively coupled to each other through a communication cable 265. The cable 265 may include, for example, an Ethernet over multiple units (eMU) cable. The cable 265 may enable the propulsion-generating vehicles 202, 204 to communicate with each other regarding various operations of the rail vehicle system 200. It is noted, however, that embodiments may utilize other methods of communicating, such as other wired systems, wired distributed power (DP) links, wireless communication (e.g., radio communication), and the like.

In the illustrated embodiment, the propulsion-generating vehicles 202, 204 are adjacent to each other and directly connected by a mechanical coupler 266. The mechanical coupler 266 may allow some tolerance or slack such that the propulsion-generating vehicles 202, 204 are permitted to move a limited distance toward each other or away from each other. In alternative embodiments, the propulsion-generating vehicles 202, 204 are not adjacent to each other. Instead, the propulsion-generating vehicles 202, 204 may be indirectly coupled to one another via other vehicles, which may be propulsion-generating or non-powered vehicles. For example, the propulsion-generating vehicle 202 may lead the rail vehicle system 200 as shown in FIG. 2 and the propulsion-generating vehicle 204 may be located at a position that is about ⅔ a length of the rail vehicle system 200 away from the propulsion-generating vehicle 204.

The propulsion-generating vehicles 202, 204 of FIG. 2 are only particular examples of locomotives that may be used with embodiments set forth herein. It is understand that various modifications may be made to the rail vehicle system 200 and that other types of locomotives may be used. For example, it may be desirable to provide an inverter for each motor or to couple additional motors to a single inverter. As such, it is understood that the inventive subject matter described herein is not limited to 4-axle systems and is equally applicable to other systems, for example, such as 6-axle locomotives with six inverters each connected for powering a respective one of six traction motors each connected to respective ones of the six axles.

The rail vehicle system 200 travels along a route 208, such as a track having one or more rails. Each of the propulsion-generating vehicles 202, 204 facilitates driving the rail vehicle system 200 using the wheelsets of the respective vehicle. For example, the traction motors 241-244 deliver torque to the wheels 271-274, which exert tangential force (e.g., tractive effort) along the route 208, thereby propelling the rail vehicle system 200 along the route 208. The TE developed at each wheel of the propulsion-generating vehicle 202 is proportional to a normal force 280 acting on the respective wheel. The axle TE of a single axle wheelset is approximately equal to the friction coefficient multiplied by the normal force 280 acting on the respective wheelset. The total TE provided by the propulsion-generating vehicle 202 is the sum of each of the axle TEs.

For a dynamic braking mode, the traction motors 241-244 are reconfigured (via power switching devices (not shown)) so that the traction motors 241-244 operate as generators. So configured, the traction motors 241-244 generate electric energy which has the effect of slowing the propulsion-generating vehicle 202. In some cases, energy generated in a dynamic braking mode may be transferred to resistance grids (not shown) that are coupled to the propulsion-generating vehicle 202. The dynamic braking energy may be converted to heat and dissipated from the propulsion-generating vehicle 202 through the grids. In other embodiments, the dynamic braking energy may be stored (e.g., batteries) by the propulsion-generating vehicle 202.

Also shown in FIG. 2, the rail vehicle system 200 may include a number of detection devices 291-295. The detection devices 293, 294 of the control system 206 may be incorporated with the inverters 232, 234, respectively, but the detection devices 293, 294 may have other locations in other embodiments. Alternatively, each of the motors 241-244 may include a respective detection device. The detection devices 293, 294 are configured to monitor one or more operating conditions that have a direct relation to TE, BE, and/or creep. More specifically, data obtained regarding the operating conditions may be used to calculate at least one of a creep measurement, a tractive measurement, or a braking measurement. In some embodiments, the detection devices 293, 294 are configured to detect a motor characteristic, such as motor current, motor RPMs, motor torque, and motor power. The data can be communicated to the measurement module 212.

The detection devices 291, 292 may obtain data from the wheelsets 261-264 that have a direct relation to TE, BE, and/or creep. Such data may be used to calculate at least one of the creep measurement, the tractive measurement, or the braking measurement described herein. For example, the detection devices 291, 292 may be configured to detect at least one of rotation speed, torque, torsional vibrations, vehicle speed (e.g., ground speed), wheel strain, axle strain, dog-bone strain, or motor speed. The data can be communicated to the measurement module 212.

In the illustrated embodiment, the detection devices 291, 292 are rotation-speed and vehicle-speed sensors, respectively. The detection devices 291 may communicate data (e.g., in the form of signals) that is representative of a rotational speed of a corresponding wheelset. For example, the detection devices 291 may measure how fast a wheel, axle, or motor shaft of the corresponding wheelset is rotating. In particular embodiments, the detection devices 291 detect a voltage or current signal of the electrical power supplied to the respective motor that is representative of the wheel speed. The detection devices 292 communicate data that is representative of how fast the propulsion-generating vehicle 202 is moving along the route 208. By way of example, the detection devices 292 may include a radar system (e.g., Doppler radar gun or other type of radar system) or a Global Positioning System (GPS) system that is used to obtain the data representative of the speed at which the propulsion-generating vehicle 202 moves along the route 208. Other vehicle speed sensors may be used as well. The data representative of the wheel speed and the vehicle speed can be communicated to the measurement module 212.

As another example, the detection devices 291-294 may monitor or obtain data relating to wheel creep to improve or optimize the wheel creep during operation of the rail vehicle system 200. More specifically, a designated tractive effort or braking effort may be obtained if each of the wheelsets 261-264 of the propulsion-generating vehicle 202 is rotating at such an angular velocity that its actual peripheral speed (e.g., wheel speed) is slightly higher (in case of motoring) or slightly lower (in case of braking) than the actual speed of the vehicle. The difference between the linear speed at which the vehicle is traveling (referred to as vehicle speed) and the wheel speed is referred to as wheel creep. There is usually a relatively low limit on the value of wheel creep at which peak tractive effort or braking effort is realized.

This value, commonly known as optimum creep, is a variable that depends on the vehicle speed and the surface conditions of the rail vehicle system 200 and the route 208. The optimum creep correlates to a peak value of an applicable wheel-rail adhesion-creep curve. Operation of any or all wheelsets away from the optimum creep, such as too large of a creep value, may cause a reduction or loss of wheel-to-surface adhesion. If the wheel-to-surface adhesion is reduced or lost, some or all the vehicle wheels may slip excessively. This is often undesirable as slippage can cause accelerated wheel wear, rail damage, high mechanical stresses in the drive components of the propulsion system, and an undesirable decrease of tractive (or braking) effort.

The detection device 295 may be operably connected to the mechanical coupler 266 and configured to detect stresses or forces sustained at the mechanical coupler 266. In some embodiments, the data obtained by the detection device 295 may be used to calculate the measurements used to determine the tribology characteristics.

The measurement module 212 is configured to obtain data relating to the creep measurements and tractive/braking measurements of the rail vehicle system 200. The data may be acquired at different locations along a route segment as the vehicle system moves through the route segment. The data that may be used to calculate the creep measurements and/or the tractive/braking measurements is communicated to the measurement module 212 from the detection devices 291-295. In some embodiments, the measurement module 212 calculates the measurements that are transmitted from the rail vehicle system 200 to the system 116. In other embodiments, the measurements are calculated by the detection devices 291-295.

In some embodiments, the measurement module 212 may analyze the measurements and/or data to determine that the data is sufficient or trustworthy. The measurement module 212 may package the measurement or data in predetermined format so that a monitoring system (e.g., system 116) may recognize the measurements. The measurement module 212 may execute preliminary processing steps. For example, the measurement module 212 may obtain data from the detection devices 291-295 and calculate the measurements that will be used to determine the effectiveness of the friction modifier. More specifically, the measurement module 212 may calculate one or more creep measurements based on the data obtained by one or more of the detection devices 291-295. The measurement module 212 may also calculate one or more tractive measurements or one or more braking measurements based on the data obtained by one or more of the detection devices 291-295.

In some embodiments, the measurement module 212 may communicate the measurements or data relating to the measurements to a transmitter 296. The transmitter 296 is configured to communicate the creep measurements and the tractive/braking measurements from the rail vehicle system 200 to, for example, the system 116. In other embodiments, the rail vehicle system 200 may calculate the tribology characteristics from the measurements and determine an effectiveness of the friction modifier. For example, the rail vehicle system 200 may have a calculation module and an analysis module that is similar or identical to the calculation and analysis modules 132, 134.

Figure 3:
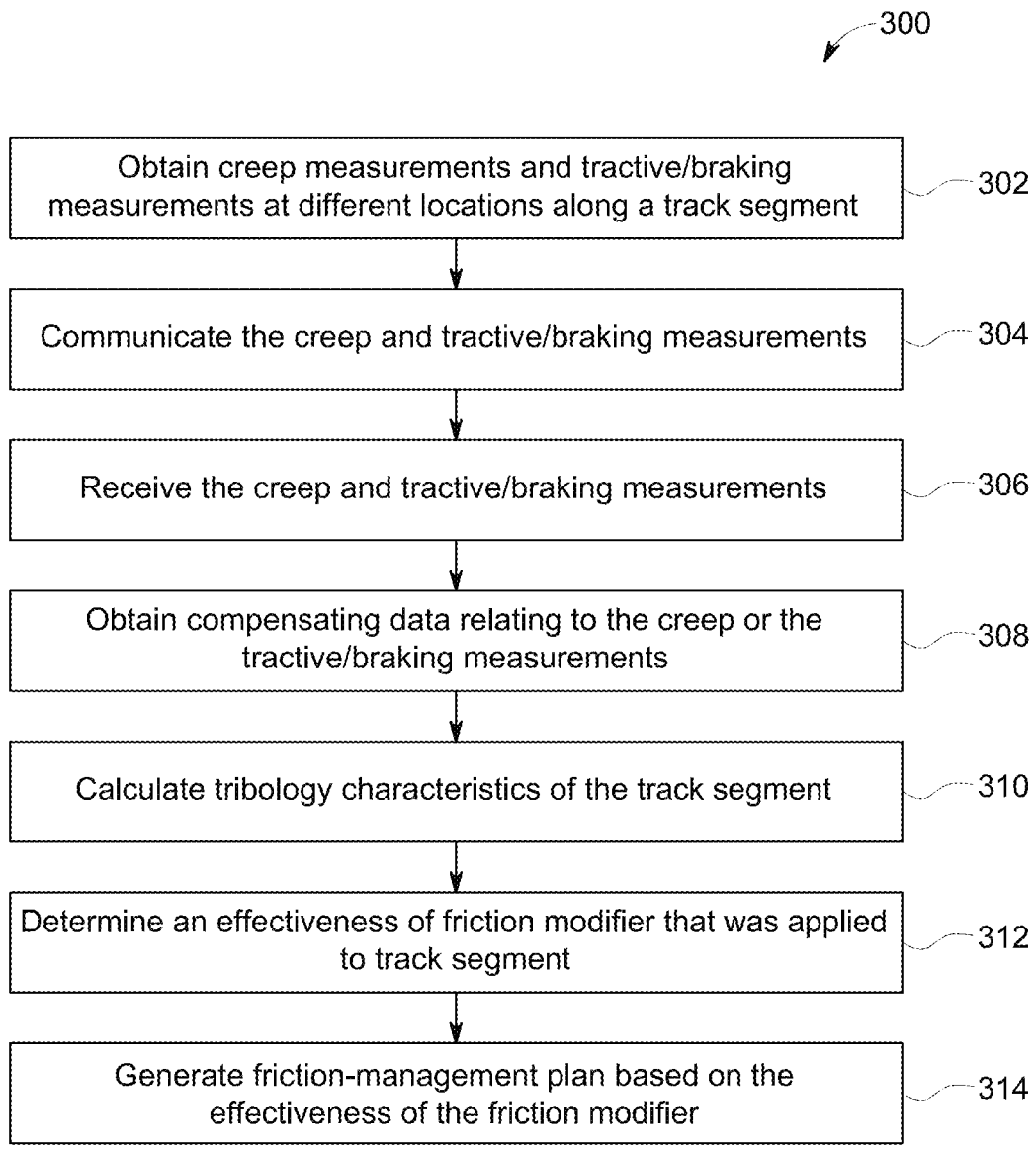
FIG. 3 is a flowchart illustrating a method in accordance with an embodiment.

FIG. 3 is a flow chart illustrating a method 300 in accordance with an embodiment. The method 300, for example, may employ structures or aspects of various embodiments (e.g., systems and/or methods) discussed herein. In various embodiments, certain steps (or operations) may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. The method 300 (or certain steps thereof) may be implemented by one or more algorithms that are executed by logic-based devices to control hardware (e.g., propulsion system, measurement module, analysis module) to perform designated operations as described herein.

The method 300 may include obtaining (at 302) creep measurements and tractive/braking measurements at different locations along a route segment. The creep measurements and the tractive/braking measurements may be measurements as described above. The creep measurements and the tractive/braking measurements or the data that is used to calculate the creep measurements and the tractive/braking measurements may be obtained during a tractive operation (e.g., while the vehicle system or propulsion-generating vehicle is motoring), during a braking operation, or when the vehicle system or propulsion-generating vehicle is idling (e.g., coasting).

In some embodiments, obtaining (at 302) includes only obtaining measurements of a single vehicle system. In other embodiments, obtaining (at 302) includes obtaining measurements from a plurality of vehicle systems. For example, each vehicle system that traverses the route segment and is capable of obtaining the creep and tractive/braking measurements may communicate the measurements to, for example, an offboard monitoring system.

Obtaining (at 302) may include obtaining measurements continuously, at a periodic rate, or at an aperiodic rate. For example, an aperiodic rate may include obtaining fewer measurements when the vehicle system is outside of the region-of-interest (e.g., in the leading or trailing baseline portions of the route segment). An aperiodic rate may include obtaining incrementally more and more measurements as the rail vehicle system approaches (e.g., becomes nearer to) the region-of-interest. In some embodiments, measurements may be continuously obtained when the vehicle system is within the region-of-interest. In other embodiments, measurements may be continuously obtained when the vehicle system is within the region-of-interest and outside the region-of-interest along the route segment.

In some embodiments, the route segment is at least a kilometer (or equivalent in miles) or at least two kilometers (or equivalent in miles). In some embodiments, the route segment is at least one mile (or equivalent in kilometers) or at least two miles (or equivalent in kilometers). In some embodiments, the creep measurements and the tractive/breaking measurements are obtained, on average, at least once every 100 meters, at least once every 50 meters, or, more specifically, at least once every 10 meters along the route segment. In some embodiments, a total number of measurements obtained and used by the analysis module is at least 100 measurements or, more specifically, at least 1000 measurements. The 100 or 1000 measurements may be from a single vehicle system or from multiple vehicle systems.

In some embodiments, obtaining (at 302) includes instructing the propulsion system of the propulsion-generating vehicle to operate in a designated manner. For example, if the propulsion-generating vehicle includes multiple wheelsets, obtaining (at 302) may include increasing the tractive effort of a first wheelset by a designated amount and decreasing the tractive effort of a second wheelset by the designated amount thereby maintaining a total tractive effort of the corresponding vehicle system. By increasing the tractive effort of the first wheelset, a clearer measurement of the tribology characteristic may be acquired. More specifically, increasing the tractive effort may induce greater slippage (e.g., a greater creep measurement) at the first wheelset that may correspond to a higher confidence in the tribology characteristic. Furthermore, by not changing the total tractive effort of the vehicle system, the measurements can be obtained automatically without substantially disrupting or deviating from the operating plan or from the operator's instructions.

Alternatively or additionally, obtaining (at 302) may include operating the corresponding vehicle system at a designated throttle setting. In some instances, the throttle setting may correspond to a maximum tractive effort. When a maximum tractive effort is sought by the vehicle system, the vehicle system may continue to increase tractive effort until the optimum creep point is determined. More specifically, the tractive/braking measurements that are obtained when the throttle setting requires a maximum tractive effort may be representative of the optimum creep point. The optimum creep point may be used to determine the tribology characteristic.

In other embodiments, obtaining (at 302) may include operating the corresponding vehicle system at a designated throttle setting in which the throttle setting requires less than maximum tractive efforts. Nonetheless, creep measurements may be obtained and associated with the applied tractive effort (or braking effort). Such instances may be particularly suitable when an initial slope of a traction-creep curve is being formed.

Accordingly, creep measurements may be acquired at any time when tractive efforts are being provided or when braking efforts are being supplied. In addition, creep measurements may be acquired when the propulsion-generating vehicle is moving but with the engine effectively idling. As described above, different wheelsets may provide different efforts such that the total change in effort (braking effort or tractive effort) is substantially zero. When the efforts of a single wheelset are changed, creep measurements may be acquired. Thus, numerous data points may be obtained that may be used to acquire information of the friction modifier. For example, the data points may be used to form a traction-creep curve.

Figure 4:
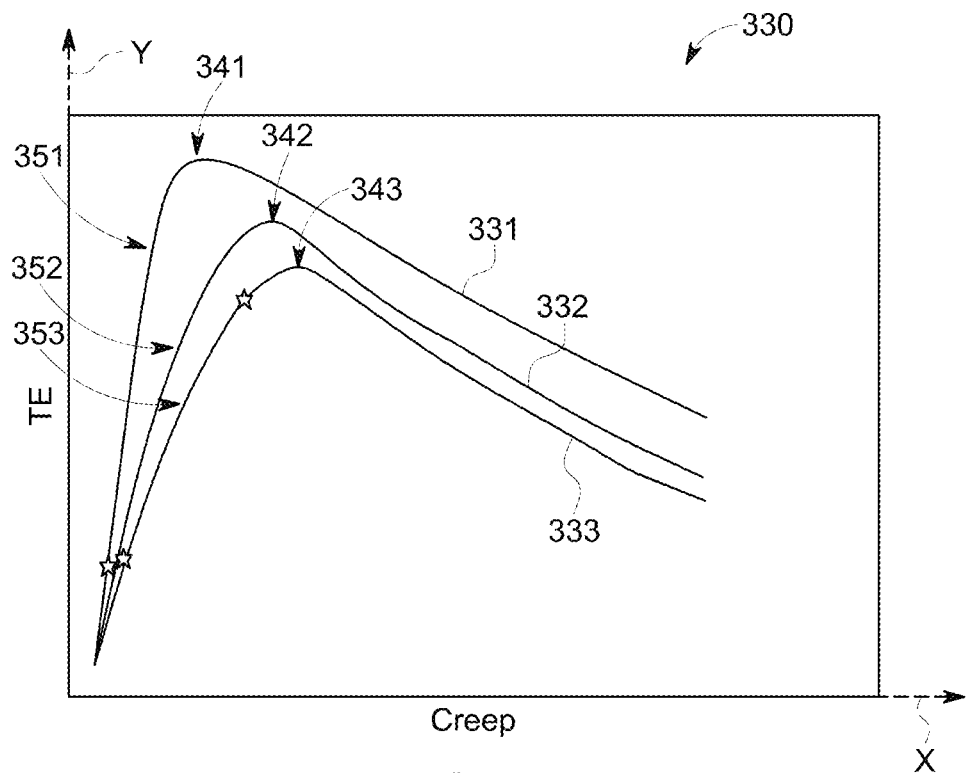
FIG. 4 illustrates a graph with representative traction-creep curves.

FIG. 4 provides a graph 330 that include traction-creep curves 331-333. Each of the traction-creep curves 331-333 represents a tractive effort versus creep relationship that is based on data points acquired at different locations along the same route segment. The y-axis corresponds to increasing tractive effort, and the x-axis corresponds to increasing creep. It should be noted that similar curves (or relationships) may be shown for other tractive/horsepower characteristics and creep. For example, under some circumstances, an adhesion coefficient may exhibit a similar relationship with creep. As shown, each curve exhibits a slightly different relationship between tractive effort and creep. This may be due to the amount of friction modifier at the location of the route segment. Each of the curves 331-333 has an optimum creep 341-343, respectively, and has a traction-creep slope 351-353, respectively. The optimum creeps 341-343 and/or the traction-creep slopes 351-353 may be used to calculate a tribology characteristic.

Returning to FIG. 3, the method 300 may also include communicating (at 304) the creep and tractive/braking measurements and receiving (at 306) the creep and tractive/braking measurements. The measurements may be received by a system (e.g., monitoring system, such as the system 116). In other embodiments, the measurements may not be communicated externally and, instead, may be communicated to an onboard system that is configured to calculate tribology characteristics and, optionally, determine an effectiveness of a friction modifier based on the tribology characteristics.

The method 300 also includes obtaining (at 308) compensating data that relates to or may have an effect on the creep or tractive/braking measurements. The tribology characteristics may be a function of various changing factors. For example, the tribology characteristics may be based on weight of the propulsion-generating vehicle or the vehicle system, speed of the vehicle system, and predetermined limits of the vehicle system. Such compensating data may be communicated by the vehicle system to the monitoring system. Other compensating data may include environmental data, such as weather conditions (e.g., rain, snow, temperature) and external rail conditions, such as leaves on the track.

The method 300 also includes calculating (at 310) tribology characteristics of the route segment at different locations. In particular embodiments, the tribology characteristic is indicative of or based on a COF at the track location or an adhesion coefficient at the track location. As described herein, COFs and adhesion coefficients may be directly affected by the application of friction modifiers. Various formulas may be used to calculate the tribology characteristics.

The method 300 may also include determining (at 312) an effectiveness of the friction modifier that was applied to the route segment (e.g., the region-of-interest in the route segment). Determining (at 312) may include determining a function (e.g., graph or relationship curve or formula) that indicates tribology characteristics as a function of location. FIG. 5 shows a graph 360 including three separate curves 361-363 illustrating such relationships between tribology characteristics and location. The friction modifier applied in this instance was lubrication configured to reduce adhesion. A region-of-interest 365 along the track is indicated, and a suitable range 366 of the tribology characteristic (e.g., adhesion coefficient) is shown for the region-of-interest 365. More specifically, it is desired that the tribology characteristics be within the suitable range 366 for the entire region-of-interest 365. As shown, the curve 361 corresponds to the route segment in which an insufficient or inadequate amount of lubrication exists for portions of the region-of-interest 365. More specifically, the tribology characteristics are relatively high and not within the suitable range 366 for portions of the region-of-interest 365. The curve 363 corresponds to the route segment in which an excessive amount of lubrication exists. As shown, the tribology characteristics are relatively low and never exceed the suitable range 366 even outside of the region-of-interest 365. More specifically, the lubrication has spread beyond the region-of-interest and may be preventing vehicle systems from obtaining a maximum tractive effort. The curve 362 corresponds to the route segment having a suitable amount of lubrication.

The suitable range can be a preset range or adapted based on a baseline tribology characteristic(s). If the suitable range is a preset range, the range can be loaded onto the processor before the vehicle takes route. The preset range may be based on industry standards or on previous tests conducted during prior tribology testing.

Alternatively, the suitable range may be adapted by tribology tests taken in route. For example, baseline measurements taken in the designated leading border location and the designated trailing border location may be incorporated into the suitable range or be used for the suitable range.

In some embodiments, determining (at 312) the effectiveness of the friction modifier may include identifying one or more portions of the route segment that have an inadequate amount of friction modifier or have an excessive amount of friction modifier. For example, the tribology characteristics for the different portions of the route segments may be compared to a first designated threshold (e.g., desired minimum or baseline amount) and/or to a second designated threshold (e.g., a desired maximum or limit amount). In some embodiments, determining (at 312) the effectiveness of the friction modifier may include comparing the tribology characteristics to expected tribology characteristics. For example, either of curves 361 and 363 may be compared to the curve 362.

The method may also include generating (at 314) a friction-management plan based on the effectiveness of the friction modifier. The friction-management plan may include instructions for applying friction modifier to the route segment. The friction modifier may be applied by passenger or freight vehicle systems, such as those that obtain the measurements, or by systems or devices that are specifically configured to apply the friction modifier. The instructions in the friction-management plan may include increasing an amount of the friction modifier at designated points along the route segment and/or decreasing an amount of the friction modifier at designated points along the track. Increasing may be accomplished by more frequent applications and/or more friction modifier being applied at each application. Decreasing may be accomplished by fewer applications and/or less friction modifier being applied at each application. The friction-management plan may also recommend using a different friction modifier.

Figure 6:
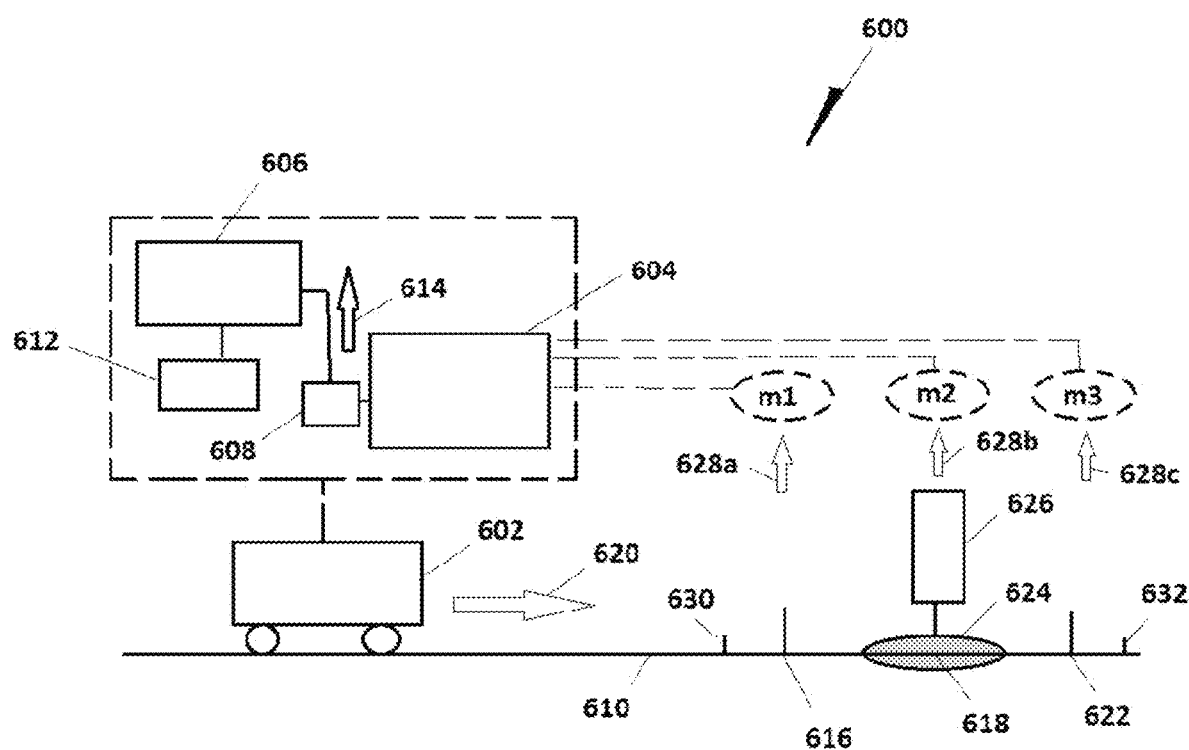
FIG. 6 is a schematic diagram of an embodiment of a vehicle control or measurement system.

As noted above, aspects of the invention relate to determining whether a friction modifier (e.g., a lubricant) has affected a portion of a route (e.g., spread) beyond a region-of-interest of the route and/or (b) whether the friction modifier remaining within and/or applied to the region-of-interest is sufficient to achieve the target effect. This may be accomplished, to reiterate, in an embodiment of a system such as shown in FIGS. 1 and 2. Reference is also made to FIG. 6, which further illustrates a system 600 (e.g., measurement system and/or vehicle control system) that includes a vehicle system 602 (see also vehicle systems 100 and 200) having a propulsion system 604 (e.g., similar to or the same as system 220), one or more processors 606 (see also, e.g., 132, 134, 210, 212, etc.), and plural sensors 608 (see also, e.g., 291, 292, etc.) on board the vehicle system. The one or more processors are configured to control the vehicle system for movement along a route 610 according to an operating plan 612 that includes plural throttle and braking settings as a function of at least one of time or distance along the route. The plural sensors are configured to communicate data 614 of one or more operating conditions of the propulsion system (e.g., as discussed above) to the one or more processors. Based on the data from the sensors and as described above/herein, the one or more processors are configured to determine, while the vehicle system moves along the route: at least one first tractive measurement or braking measurement of the vehicle system m1 at a designated leading border location 616 along the route; at least one second tractive measurement or braking measurement of the vehicle system m2 at a designated location of interest 618 along the route after the leading border location relative to a direction of movement 620 of the vehicle system; and at least one third tractive measurement or braking measurement of the vehicle system m3 at a designated trailing border location 622 along the route after the location of interest relative to the direction of movement of the vehicle system. (As shown in the figure, measurements m1, m2, and m2 are schematic representations indicating that each measurement is taken when the vehicle system arrives at the given location.) Thus, as the vehicle system moves along the route in the direction of movement, the vehicle system first arrives at the designated leading border location 616, and then arrives at the designated location of interest 618 (which is spaced apart from the designated leading border location by a non-zero distance), and then arrives at the designated trailing border location 622 (which is spaced apart from the designated location of interest by the same or another non-zero distance). Each of the designated leading border location, the designated location of interest, and the designated trailing border location is designated in the operating plan, e.g., each is a respective known and fixed location along the route prior to the vehicle system commencing travel along the route according to the operating plan. The one or more processors are configured to at least one of: determine tribology characteristics of the designated location of interest based on the at least one first tractive measurement or braking measurement, the at least one second tractive measurement or braking measurement, and the at least one third tractive measurement or braking measurement (e.g., using methods as discussed above); or communicate the at least one first tractive measurement or braking measurement, the at least one second tractive measurement or braking measurement, and the at least one third tractive measurement or braking measurement for an off-board determination of the tribology characteristics. The one or more processors may be configured to control the vehicle system based on the tribology characteristics that are determined.

The location of interest 618 may be a location of a friction modifier 624 (e.g., lubricant) that is applied to a route surface at the location of interest. For example, the friction modifier may be applied by a stationary wayside lubrication device 626 that is configured to apply the friction modifier (e.g., lubricant) to the route surface at the location of interest.

In the system 600, for the at least one first tractive measurement or braking measurement, the at least one second tractive measurement or braking measurement, and the at least one third tractive measurement or braking measurement, the one or more processors may be configured to control the propulsion system to apply a respective designated amount of tractive effort or braking effort 628a, 628b, 628c at each of the designated leading border location, the designated location of interest, and the designated trailing border location, respectively, the designated amount of tractive effort or braking effort being outside of normal operation of the vehicle system. The designated amount of tractive effort or braking effort may be the same at each location, different at each location, or the same at two of the locations (e.g., the leading and trailing border locations) and different at the third location (e.g., the designated location of interest). This may reflect that even though a lubricant has unintendedly spread beyond the region-of-interest (e.g., designated location of interest), there will likely be less of the lubricant at a border location, and thereby the vehicle system may be controlled at the border locations, such as via a higher-magnitude braking effort or tractive effort, to detect the effects of the smaller amount/degree of lubricant.

In another embodiment of the system 600, and based on the data from the sensors, the one or more processors are further configured to determine, while the vehicle system moves along the route: at least one fourth tractive measurement or braking measurement of the vehicle system at a designated leading baseline location 630 (e.g., designated in an operation plan); and at least one fifth tractive measurement or braking measurement of the vehicle system at a designated trailing baseline location 632 (e.g., designated in the operation plan). Relative to the direction of travel of the vehicle 620, the leading baseline location is the first designated location encountered by the vehicle (ahead of the designated leading border location) and the trailing baseline location is the last designated location encountered by the vehicle, after passing the designated trailing border location. The baseline locations are far enough away from the border locations such that the probability of any lubricant spreading there from the location of interest (e.g., stationary wayside lubricator device) is low or zero, or at least to the extent there might be trace amounts of lubricant it is either non-measurable, or has no or negligible effects on passing vehicles, i.e., either no lubricant, or a miniscule or negligible amount that does not affect vehicle travel. Measurements at the baseline locations can be used as baseline measurements, for indicating properties of the route where there is no friction modifier, as discussed above.

By taking the measurements at the designated locations (successively, 630, 616, 618, 622, and 632), the measurements can be compared to one another (e.g., comparing of respective determined friction coefficients at each location) to determine operational effectiveness of a wayside lubricator device (e.g., the device is not outputting enough lubricant at the location of interest) and/or spreading (e.g., the device is outputting too much lubricant at the location of interest, such that the lubricant is spreading to border locations where it is not desired to have lubricant, or lubricant over a certain amount/level). For example, five measurements at the five designated successive locations where the respective friction coefficients at the locations are all the same would indicate non-functionality of the wayside lubricator, whereas having the same friction coefficients at the border locations and location of interest (e.g., fixed location of the device) but different friction coefficients at the baseline locations would indicate undesirable spreading.

In an embodiment, a method is provided that includes obtaining creep measurements and tractive/braking measurements from at least one vehicle system at different locations along a route segment while the at least one vehicle system moves through the route segment. The method also includes calculating tribology characteristics of the route segment at the different locations. The tribology characteristics are based on the creep measurements and the tractive/braking measurements from the at least one vehicle system. The tribology characteristics are indicative of a friction coefficient of the route segment at the different locations. The method also includes determining an effectiveness of a friction modifier applied to the route segment based on the tribology characteristics.

In one aspect, obtaining the creep measurements and the tractive/breaking measurements may include obtaining a series of the creep measurements and the tractive/breaking measurements throughout the route segment from each of the vehicle systems. Optionally, the route segment may be at least a half-kilometer long or at least one kilometer long or, more particularly, at least two kilometers long. Optionally, the creep measurements and the tractive/breaking measurements may be obtained, on average, at least once every 100 meters of the route segment. In some embodiments, the creep measurements and the tractive/breaking measurements may be obtained, on average, at least once every 50 meters of the route segment. In more particular embodiments, the creep measurements and the tractive/breaking measurements may be obtained, on average, at least once every 10 meters of the route segment.

In another aspect, obtaining the creep measurements and the tractive/braking measurements from the at least one vehicle system includes obtaining the creep measurements and the tractive/braking measurements in response to a tractive effort of a first wheelset being increased by a designated amount and a tractive effort of a second wheelset being decreased by the designated amount thereby maintaining a total tractive effort of the at least one vehicle system.

In another aspect, obtaining the creep measurements and the tractive/braking measurements from the at least one vehicle system includes the tractive/braking measurements being representative of maximum tractive efforts at the different locations.

In another aspect, the at least one vehicle system operates in accordance with an operating plan. The operating plan includes predetermined instructions for one or more propulsion-generating vehicles of the at least one vehicle system to provide at least one of a designated tractive effort or a designated braking effort.

In another aspect, the at least one vehicle system includes at least one locomotive in which a plurality of the creep measurements and a plurality of the tractive/braking measurements are obtained from the at least one locomotive.

In another aspect, the method also includes obtaining creep measurements and tractive/braking measurements from at least one other separate vehicle system while the at least one other separate vehicle system moves through the route segment. Calculating the tribology characteristic of the route segment includes using the creep measurements and the tractive/braking measurements from the at least one other separate vehicle system.

In another aspect, obtaining the creep measurements and the tractive/braking measurements includes obtaining the creep measurements and the tractive/braking measurements at an off-board (e.g., remotely located site) monitoring system. The at least one vehicle system may be a plurality of separate vehicle systems that travel along the route segment.

In another aspect, the tribology characteristic is an adhesion coefficient or is based on or indicative of the adhesion coefficient.

In another embodiment, a system (e.g., monitoring system) is provided that includes a receiver configured to receive creep measurements and tractive/braking measurements from at least one vehicle system at different locations along a route segment while the at least one vehicle system moves through the route segment. The system also includes a calculation module configured to calculate tribology characteristics of the route segment at the different locations. The tribology characteristics are based on the creep measurements and the tractive/braking measurements from the at least one vehicle system. The tribology characteristics are indicative of a friction coefficient of the route segment at the different locations. The system also includes an analysis module configured to determine an effectiveness of a friction modifier applied to the route segment based on the tribology characteristics at the different locations.

In one aspect, the analysis module is configured to compare the tribology characteristics at the different locations to expected tribology characteristics at the different locations.

In another aspect, the analysis module is configured to identify one or more regions of the route segment that having an amount of the friction modifier that is below a first designated threshold and identify one or more regions of the route segment having an amount of the friction modifier that is above a second designated threshold.

In another aspect, the receiver is configured to receive compensating data relating to route conditions and the analysis module is configured to determine the effectiveness of the friction modifier using the compensating data to compensate for the route conditions.

In another aspect, the receiver is configured to receive a series of the creep measurements and the tractive/breaking measurements throughout the route segment from the at least one vehicle system.

In another aspect, the route segment is at least two kilometers long and wherein the creep measurements and the tractive/breaking measurements are obtained, on average, at least once every 50 meters for the route segment.

In another aspect, a system (e.g., control system of a vehicle system) is provided that includes a vehicle-control module configured to control tractive and braking operations of a vehicle system. The system also includes a measurement module configured to obtain creep measurements and tractive/braking measurements of the vehicle system at different locations along a route segment while the vehicle system moves through the route segment. The system also includes a transmitter configured to communicate the creep measurements and the tractive/braking measurements from the vehicle system. The vehicle-control module is configured to increase the tractive effort of a first wheelset by a designated amount and decrease the tractive effort of a second wheelset by the designated amount thereby maintaining a total tractive effort of the vehicle system. The measurement module is configured to obtain the creep measurements and the tractive/braking measurements when the first and second wheelsets operate at increased and decreased tractive efforts, respectively.

In one aspect, the measurement module is configured to obtain the creep measurements and the tractive/braking measurements of the vehicle system when the vehicle system is operating at a designated throttle setting. The tractive/braking measurements may be representative of maximum tractive efforts at the different locations.

In another aspect, the vehicle-control module is configured to control the vehicle system in accordance with an operating plan. The operating plan includes predetermined instructions for one or more propulsion-generating vehicles of the vehicle system to provide at least one of a designated tractive effort or a designated braking effort.

In another aspect, the vehicle system includes a locomotive.

In another aspect, the vehicle system includes a plurality of locomotives. The calculation module is configured to obtain the creep measurements and the tractive/braking measurements from the plurality of locomotives.

In another aspect, the vehicle system includes a train that transports at least one of freight or passengers.

In another aspect, at least some of the vehicle systems may include plural locomotives. Each of the locomotives may obtain a plurality of the creep measurements and a plurality of the tractive/braking measurements.

In another aspect, the vehicle systems may include trains that transport at least one of freight or passengers.

In an embodiment, a system is provided that includes a receiver configured to receive creep measurements and tractive/braking measurements from multiple vehicle systems at different locations along a route segment while the vehicle systems move through the route segment. The system may also include a calculation module that is configured to calculate a tribology characteristic of the route segment at the different locations. The tribology characteristic is based on the creep measurements and the tractive/braking measurements from the vehicle systems, wherein the tribology characteristic is indicative of a friction coefficient of the route segment at the respective location. The system may also include an analysis module that is configured to determine an effectiveness of a friction modifier applied to the route segment based on the tribology characteristic.

In another aspect, the route segment is at least a half-kilometer long or at least one kilometer long or, more particularly, at least two kilometers long. Optionally, a number of the creep measurements and the tractive/breaking measurements may correlate to, on average, at least once every 100 meters of the route segment, at least once every 50 meters of the route segment, or at least once every 10 meters of the route segment.

In an embodiment, a system (e.g., measurement system and/or vehicle control system) includes a vehicle system having a propulsion system, one or more processors, and plural sensors on board the vehicle system. The one or more processors are configured to control the vehicle system for movement along a route according to an operating plan that includes plural throttle and braking settings as a function of at least one of time or distance along the route. The plural sensors are configured to communicate data of one or more operating conditions of the propulsion system to the one or more processors. Based on the data from the sensors, the one or more processors are configured to determine, while the vehicle system moves along the route: at least one first tractive measurement or braking measurement of the vehicle system at a designated leading border location along the route; at least one second tractive measurement or braking measurement of the vehicle system at a designated location of interest along the route after the leading border location relative to a direction of movement of the vehicle system; and at least one third tractive measurement or braking measurement of the vehicle system at a designated trailing border location along the route after the location of interest relative to the direction of movement of the vehicle system. Each of the designated leading border location, the designated location of interest, and the designated trailing border location is designated in the operating plan. The one or more processors are configured to at least one of: determine tribology characteristics of the designated location of interest based on the at least one first tractive measurement or braking measurement, the at least one second tractive measurement or braking measurement, and the at least one third tractive measurement or braking measurement; or communicate the at least one first tractive measurement or braking measurement, the at least one second tractive measurement or braking measurement, and the at least one third tractive measurement or braking measurement for an off-board determination of the tribology characteristics.

In another embodiment of the system, the location of interest is a location of a friction modifier (e.g., lubricant) that is applied to a route surface at the location of interest. For example, the friction modifier may be applied by a stationary wayside lubrication device that is configured to apply the friction modifier (e.g., lubricant) to the route surface at the location of interest.

In another embodiment of the system, the one or more processors are configured to control the vehicle system based on the tribology characteristics that are determined.

In another embodiment of the system, the one or more processors are configured to compare the at least one first tractive measurement or braking measurement, the at least one second tractive measurement or braking measurement, and the at least one third tractive measurement or braking measurement to a suitable range of the tribology characteristics to determine an effectiveness of the friction modifier.

In another embodiment of the system, the one or more processors are configured to determine the tribology characteristics of the designated location of interest onboard the vehicle system based on the at least one first tractive measurement or braking measurement, the at least one second tractive measurement or braking measurement, and the at least one third tractive measurement or braking measurement.

In another embodiment, the system further includes a radio onboard the vehicle system. The one or more processors are configured to control the radio to wirelessly communicate the at least one first tractive measurement or braking measurement, the at least one second tractive measurement or braking measurement, and the at least one third tractive measurement or braking measurement for an off-board determination of the tribology characteristics.

In another embodiment of the system, for the at least one first tractive measurement or braking measurement, the at least one second tractive measurement or braking measurement, and the at least one third tractive measurement or braking measurement, the one or more processors are configured to control the propulsion system to apply a designated amount of tractive effort or braking effort at each of the designated leading border location, the designated location of interest, and the designated trailing border location, respectively, the designated amount of tractive effort or braking effort being outside of normal operation of the vehicle system.

In another embodiment of the system, the one or more processors are configured to modify or generate a friction modification plan based on the at least one first tractive measurement or braking measurement, the at least one second tractive measurement or braking measurement, and the at least one third tractive measurement or braking measurement.

In an embodiment, a method (e.g., of controlling vehicles) includes, with one or more processors, controlling a vehicle system having a propulsion system for movement along a route according to an operating plan that includes plural throttle and braking settings as a function of at least one of time or distance along the route. The method also includes, with plural sensors on board the vehicle system, communicating data of one or more operating conditions of the propulsion system to the one or more processors. The method also includes determining, with the one or more processors and based on the data from the sensors, while the vehicle system moves along the route: at least one first tractive measurement or braking measurement of the vehicle system at a designated leading border location along the route; at least one second tractive measurement or braking measurement of the vehicle system at a designated location of interest along the route after the leading border location relative to a direction of travel of the vehicle system; and at least one third tractive measurement or braking measurement of the vehicle system at a designated trailing border location along the route after the location of interest relative to the direction of travel of the vehicle system, each of the designated leading border location, the designated location of interest, and the designated trailing border location being designated in the operating plan. The method further includes, with the one or more processors, at least one of: determining tribology characteristics of the designated location of interest based on the at least one first tractive measurement or braking measurement, the at least one second tractive measurement or braking measurement, and the at least one third tractive measurement or braking measurement; and/or communicating the at least one first tractive measurement or braking measurement, the at least one second tractive measurement or braking measurement, and the at least one third tractive measurement or braking measurement for an off-board determination of the tribology characteristics.

In another embodiment of the method, the location of interest is a location of a stationary wayside lubrication device that is configured to apply lubrication to a route surface at the location of interest.

In another embodiment, the method further includes comparing the at least one first tractive measurement or braking measurement, the at least one second tractive measurement or braking measurement, and the at least one third tractive measurement or braking measurement to a suitable range of the tribology characteristics to determine an effectiveness of the lubrication.

In another embodiment, the method further includes comparing controlling, with the one or more processors, the vehicle system based on the tribology characteristics that are determined.

In another embodiment, the tribology characteristics of the designated location of interest are determined onboard the vehicle system, with the one or more processors, based on the at least one first tractive measurement or braking measurement, the at least one second tractive measurement or braking measurement, and the at least one third tractive measurement or braking measurement.

In another embodiment, the method further includes wirelessly communicating, using a radio onboard the vehicle system, the at least one first tractive measurement or braking measurement, the at least one second tractive measurement or braking measurement, and the at least one third tractive measurement or braking measurement for the off-board determination of the tribology characteristics.

In another embodiment, the method further includes applying a designated amount of tractive effort or braking effort at each of the designated leading border location, the designated location of interest, and the designated trailing border location, respectively, the designated amount of tractive effort or braking effort being outside of normal operation of the vehicle system, for the at least one first tractive measurement or braking measurement, the at least second tractive measurement or braking measurement, and the at least one third tractive measurement or braking measurement.

In another embodiment, the method further includes modifying a friction modification plan or generating the friction modification plan based on the at least one first tractive measurement or braking measurement, the at least one second tractive measurement or braking measurement, and the at least one third tractive measurement or braking measurement.

In an embodiment, a system includes a vehicle system having a propulsion system, one or more processors, and plural sensors on board the vehicle system. The one or more processors are configured to control the vehicle system for movement along a route. The plural sensors are configured to communicate data of one or more operating conditions of the propulsion system to the one or more processors. Based on the data from the sensors, the one or more processors are configured to determine, while the vehicle system moves along a predetermined segment of the route that was predetermined prior to commencement of travel of the vehicle system along the route (e.g., in an operation plan or otherwise, such as by referencing a route database that includes information of route features), at least one tractive measurement or braking measurement of the vehicle system at a location of interest along the route along the predetermined segment of the route. The one or more processors are also configured to at least one of: determine tribology characteristics of the designated location of interest based the at least one tractive measurement or braking measurement; and/or communicate the at least one tractive measurement or braking measurement for an off-board determination of the tribology characteristics.

As used herein, the terms "system" and "module" include a hardware and/or software system that operates to perform one or more functions. For example, a module or system may include a computer processor, controller, or other logic-based device that performs operations based on instructions stored on a tangible and non-transitory computer readable storage medium, such as a computer memory. Alternatively, a module or system may include a hard-wired device that performs operations based on hard-wired logic of the device. The modules shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" or "an embodiment" of the presently described inventive subject matter are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the inventive subject matter, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, controllers or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

What is claimed is:

1. A system comprising:
    a vehicle system having a propulsion system and one or more processors, wherein the one or more processors are configured to control the vehicle system for movement along a route according to an operating plan that includes plural throttle and braking settings for different locations along the route; and
    plural sensors on board the vehicle system configured to communicate data of one or more operating conditions of the propulsion system to the one or more processors;
    wherein, based on the data from the sensors, the one or more processors are configured to determine, while the vehicle system moves along the route:
        at least one first tractive measurement or first braking measurement of the vehicle system at a designated leading border location along the route;
        at least one second tractive measurement or second braking measurement of the vehicle system at a designated location of interest along the route after the designated leading border location relative to a direction of movement of the vehicle system; and
        at least one third tractive measurement or third braking measurement of the vehicle system at a designated trailing border location along the route after the designated location of interest relative to the direction of movement of the vehicle system, each of the designated leading border location, the designated location of interest, and the designated trailing border location designated in the operating plan; and
    wherein the one or more processors are configured to determine tribology characteristics of the designated location of interest based on: (a) the at least one first tractive measurement or first braking measurement, (b) the at least one second tractive measurement or second braking measurement, and (c) the at least one third tractive measurement or third braking measurement.

2. The system of claim 1, wherein the designated location of interest is a location of a friction modifier that is applied to a route surface at the designated location of interest.

3. The system of claim 2, wherein the friction modifier is applied by a stationary wayside lubrication device that is configured to apply the friction modifier to the route surface at the designated location of interest.

4. The system of claim 2, wherein the one or more processors are configured to compare the at least one first tractive measurement or first braking measurement, the at least one second tractive measurement or second braking measurement, and the at least one third tractive measurement or third braking measurement to a suitable range of the tribology characteristics to determine an effectiveness of the friction modifier.

5. The system of claim 1, wherein the one or more processors are configured to control the vehicle system based on the tribology characteristics that are determined.

6. The system of claim 1, wherein for the at least one first tractive measurement or first braking measurement, the at least one second tractive measurement or second braking measurement, and the at least one third tractive measurement or third braking measurement, the one or more processors are configured to control the propulsion system to apply a designated amount of tractive effort or braking effort outside of normal operation of the vehicle system.

7. The system of claim 1, wherein the one or more processors are configured to modify or generate a friction modification plan based on the at least one first tractive measurement or first braking measurement, the at least one second tractive measurement or second braking measurement, and the at least one third tractive measurement or third braking measurement.

8. The system of claim 1, wherein, based on the data from the sensors, the one or more processors are configured to determine, while the vehicle system moves along the route, a first creep measurement of the vehicle system at the designated leading border location, a second creep measurement of the vehicle system at the designated location of interest, and a third creep measurement of the vehicle system at the designated trailing border location, and
    wherein the one or more processors are configured to determine the tribology characteristics of the designated location of interest based also on the first, second, and third creep measurements.

9. The system of claim 8, wherein the sensors on board the vehicle system include a rotation-speed sensor configured to measure rotational speed of a wheel of the vehicle system and a vehicle-speed sensor configured to measure ground speed of the vehicle system, and
    wherein the one or more processors are configured to determine the first, second, and third creep measurements based on differences between the measured rotational speed of the wheel and the measured ground speed of the vehicle system at the designated leading border location, the designated location of interest, and the designated trailing border location, respectively.

10. The system of claim 8, wherein the one or more processors are configured to determine:
    a first coefficient of friction on the route at the designated leading border location based on the first creep measurement and the at least one first tractive measurement or first braking measurement;
    a second coefficient of friction on the route at the designated location of interest based on the second creep measurement and the at least one second tractive measurement or second braking measurement; and
    a third coefficient of friction on the route at the designated trailing border location based on the third creep measurement and the at least one third tractive measurement or third braking measurement, and
    the one or more processors are configured to compare the first, second, and third coefficients of friction to determine an extent of spreading of a lubricant that is applied to the route at the designated location of interest.

11. The system of claim 10, wherein, in response to determining that the first, second, and third coefficients of friction are within a designated range of each other, the one or more processors are configured to determine that a wayside lubricator device that is configured to apply the lubricant to the route is either non-functional or is outputting an excessive amount of lubricant.

12. The system of claim 10, wherein the one or more processors are further configured to compare the first, second, and third coefficients of friction to a fourth coefficient of friction that represents a baseline measurement of the route lacking the lubricant.

13. The system of claim 1, wherein the one or more processors are configured to control the propulsion system, according to the operating plan, to apply a designated maximum tractive effort or braking effort at each of the designated leading border location, the designated location of interest, and the designated trailing border location, for determining the at least one first tractive measurement or first braking measurement, the at least one second tractive measurement or second braking measurement, and the at least one third tractive measurement or third braking measurement, respectively.

14. A method comprising:
  with one or more processors, controlling a vehicle system having a propulsion system for movement along a route according to an operating plan that includes plural throttle and braking settings for different locations along the route; and
  with plural sensors on board the vehicle system, communicating data of one or more operating conditions of the propulsion system to the one or more processors;
  determining, with the one or more processors and based on the data from the sensors, while the vehicle system moves along the route:
    at least one first tractive measurement or first braking measurement of the vehicle system at a designated leading border location along the route;
    at least one second tractive measurement or second braking measurement of the vehicle system at a designated location of interest along the route after the designated leading border location relative to a direction of travel of the vehicle system; and
    at least one third tractive measurement or third braking measurement of the vehicle system at a designated trailing border location along the route after the designated location of interest relative to the direction of travel of the vehicle system, each of the designated leading border location, the designated location of interest, and the designated trailing border location being designated in the operating plan; and
  with the one or more processors, determining tribology characteristics of the designated location of interest based on: (a) the at least one first tractive measurement or first braking measurement, (b) the at least one second tractive measurement or second braking measurement, and (c) the at least one third tractive measurement or third braking measurement.

15. The method of claim 14, wherein the designated location of interest is a location of a stationary wayside lubrication device that is configured to apply lubrication to a route surface at the designated location of interest.

16. The method of claim 15, further comprising comparing the at least one first tractive measurement or first braking measurement, the at least one second tractive measurement or second braking measurement, and the at least one third tractive measurement or third braking measurement to a suitable range of the tribology characteristics to determine an effectiveness of the lubrication.

17. The method of claim 14, further comprising controlling, with the one or more processors, the vehicle system based on the tribology characteristics that are determined.

18. The method of claim 14, further comprising applying a designated amount of tractive effort or braking effort at each of the designated leading border location, the designated location of interest, and the designated trailing border location, respectively, the designated amount of tractive effort or braking effort being outside of normal operation of the vehicle system.

19. The method of claim 14, further comprising modifying a friction modification plan or generating the friction modification plan based on the at least one first tractive measurement or first braking measurement, the at least one second tractive measurement or second braking measurement, and the at least one third tractive measurement or third braking measurement.

20. A system comprising:
  one or more processors disposed off-board a vehicle system that travels along a route, the one or more processors communicatively connected to the vehicle system and configured to receive from the vehicle system:
    a first tractive measurement or first braking measurement of the vehicle system that is determined while the vehicle system is at a leading border location along a predetermined segment of the route;
    a second tractive measurement or second braking measurement of the vehicle system that is determined while the vehicle system is at a location of interest along the predetermined segment of the route after the leading border location relative to a direction of movement of the vehicle system; and
    a third tractive measurement or third braking measurement of the vehicle system that is determined while the vehicle system is at a trailing border location along the predetermined segment of the route after the location of interest relative to the direction of movement of the vehicle system,
  wherein the leading border location, the location of interest, and the trailing border location are predetermined prior to commencement of travel of the vehicle system along the route, and
  the one or more processors are further configured to determine tribology characteristics for the location of interest along the predetermined segment of the route based at least in part on: (a) the first tractive measurement or first braking measurement, (b) the second tractive measurement or second braking measurement, and (c) the third tractive measurement or third braking measurement.

21. The system of claim 20, wherein the one or more processors disposed off-board the vehicle system are configured to generate a control signal to control one or both of the vehicle system or a wayside device based on the tribology characteristics that are determined for the location of interest.

* * * * *